(12) United States Patent
Rapport et al.

(10) Patent No.: US 10,794,541 B2
(45) Date of Patent: Oct. 6, 2020

(54) APPARATUS FOR FLEXIBLE, PROGRAMMED, CONTROLLED TRANSFER OF LIQUIDS IN MULTI-TANK SYSTEMS

(71) Applicant: CleanWorld, Gold River, CA (US)

(72) Inventors: Joshua L. Rapport, San Francisco, CA (US); Stephen P. Tourigny, Folsom, CA (US)

(73) Assignee: CleanWorld, Gold River ( * ) Notice: Subject to any disclaimer, the term of this patent is extended or adjusted under 35 U.S.C. 154(b) by 0 days.

(21) Appl. No.: 16/154,077

(22) Filed: Oct. 8, 2018

(65) Prior Publication Data

US 2019/0107255 A1    Apr. 11, 2019

Related U.S. Application Data

(60) Provisional application No. 62/569,252, filed on Oct. 6, 2017.

(51) Int. Cl.
*F17C 13/04* (2006.01)
*F04B 23/02* (2006.01)
*F04B 49/035* (2006.01)
*C02F 1/00* (2006.01)

(52) U.S. Cl.
CPC .............. *F17C 13/04* (2013.01); *C02F 1/00* (2013.01); *F04B 23/025* (2013.01); *F04B 49/035* (2013.01); *F04B 2205/05* (2013.01); *F17C 2205/0323* (2013.01); *F17C 2205/0388* (2013.01); *F17C 2227/0135* (2013.01); *F17C 2227/0171* (2013.01); *F17C 2227/04* (2013.01); *F17C 2250/0673* (2013.01); *F17C 2270/05* (2013.01)

(58) Field of Classification Search
CPC .............. F17C 14/04; F17C 2205/0323; F17C 2250/0673; F17C 2227/04; F17C 2227/0171; F17C 2227/0135; F17C 2270/05; F17C 2205/0388; C02F 1/00; F04B 49/035; F04B 23/025
USPC .................................. 141/231, 236, 244, 302
See application file for complete search history.

(56) References Cited

U.S. PATENT DOCUMENTS

| | | | |
|---|---|---|---|
| 9,103,193 B2 * | 8/2015 | Coli | F04B 17/03 |
| 2011/0197988 A1 * | 8/2011 | Van Vliet | B67D 7/04 |
| | | | 141/1 |
| 2011/0272158 A1 * | 11/2011 | Neal | B67D 7/36 |
| | | | 166/305.1 |
| 2018/0003342 A1 * | 1/2018 | Kunkel | F17C 1/00 |
| 2018/0266217 A1 * | 9/2018 | Funkhouser | G06Q 10/0633 |

* cited by examiner

*Primary Examiner* — Craig M Schneider
*Assistant Examiner* — Jason K Niesz
(74) *Attorney, Agent, or Firm* — Haverstock & Owens LLP

(57) ABSTRACT

A pumping system, method and device for pumping from and to any two or more vessels in a multiple vessel process where all permutations of the source and destination vessels are possible, but only specific combinations are required as part of the regular, repeat, controlled process system.

30 Claims, 9 Drawing Sheets

APPARATUS FOR FLEXIBLE, PROGRAMMED, CONTROLLED TRANSFER OF LIQUIDS IN MULTI-TANK SYSTEMS

RELATED APPLICATIONS

The present application claims priority to U.S. Provisional Patent App. No. 62/569,252, entitled APPARATUS FOR FLEXIBLE, PROGRAMMED, CONTROLLED TRANSFER OF LIQUIDS IN MULTI-TANK SYSTEMS, and filed Oct. 6, 2017, which is hereby incorporated by reference.

FIELD OF THE INVENTION

The invention is in the technical field of liquid transfer systems. In particular, the invention relates to pumping from and to a plurality of vessels in a multiple vessel process.

BACKGROUND OF THE INVENTION

Installations of multi-vessel systems exist in many industries in which liquids must be transferred between vessels on regular intervals. Many of these installations are customized to the process needs, which leads to installation of multiple pumps, valves, and controls, often spread throughout a plant according to the space and shape of the facility. Systems utilizing separate pumps and valves specific for the process requirements waste materials and incur excess costs due to redundancies and inefficiencies. In addition, control systems for these plants are typically built from scratch incurring lengthy and costly investments. Some of these systems are used in anaerobic digestion facilities where multiple vessels may be used for storage, staging, chemical additions, bioreactors, and post-treatment processing.

SUMMARY OF THE INVENTION

A pumping system, method and device for pumping from and to any two or more vessels in a multiple vessel process where all permutations of the source and destination vessels are possible, but only specific combinations are required as part of the regular, repeat, controlled process system. It is directed to industries where sequential, repeat, controlled liquid transfers between multiple vessels or tanks are required for proper operation of the process, such as anaerobic digestion, wastewater treatment, and other biological or chemical treatment processes. This pumping system, method and device simplifies installation and operation of pumps, valves, pipe manifolds, wiring, controls, and instruments required for executing and automating such transfers.

A first aspect is directed to a multi-tank liquid transfer system. The system comprises a plurality of tanks storing at least one liquid medium and each having at least one tank output and at least one tank input, and a plurality of skids coupled with the plurality of tanks, wherein each of the skids comprise a frame, a pump having a pump input and a pump output, a suction manifold coupled to the pump input and including at least one suction crossover port and a plurality of suction input ports that are each coupled to the tank output of one of the tanks and a pressure manifold coupled to the pump output and including at least one pressure crossover port and a plurality of pressure output ports that are each coupled to the tank input of one of the tanks, wherein the suction manifolds of each of the skids are coupled together via the suction crossover ports of one or more of the skids and the pressure manifolds of each of the skids are coupled together via the pressure crossover ports of one or more of the one or more of the skids. In some embodiments, each of the suction crossover ports, the pressure crossover ports, the suction input ports and the pressure output ports are flush with at least one plane defined by an outer face of the frame. In some embodiments, at least one of the skids comprises an additional manifold that is not coupled to the pump and has at least one additional crossover port, at least one additional output port that is coupled to the tank input of one of the tanks, and at least one additional input port that is coupled to the tank output of the one of the tanks.

In some embodiments, at least one of the skids comprises a check valve that prevents the reverse flow of the liquid medium through at least one of the pressure manifold, the pump and the suction manifold. In some embodiments, at least one of the skids comprises a pump bypass that couples the suction manifold of the at least one of the skids directly to the pressure manifold of the at least one of the skids and a bypass valve that opens and closes the pump bypass. In some embodiments, each of the suction input ports and the pressure output ports has a corresponding control valve that opens and closes that port. In some embodiments, each of the skids comprise a controller that controls the opening and closing of the controls valves in order to effectuate a transfer of the liquid medium to and/or from one or more of the tanks through the skid. In some embodiments, when coupled together, the controller of one of the skids is able to control the opening and closing of the control valves of each of the skids coupled to the one of the skids and is thereby able to effectuate a transfer of the liquid medium to and/or from one or more of the tanks coupled to one of the skids to and/or from one or more of the tanks coupled to another of the skids. In some embodiments, the controller is able to store one or more predefined transfers and effectuate the transfers in a desired order, at a desired time and at a desired frequency. In some embodiments, each of the pressure manifold and the suction manifold of at least one of the skids comprises a T-joint that terminates in a pair of cleanout ports that are flush with a plane defined by a face of the frame of that skid.

A second aspect is directed to a skid for use in a multi-tank liquid transfer system including a plurality of tanks storing at least one liquid medium and each having at least one tank output and at least one tank input. The skid comprises a frame, a pump having a pump input and a pump output, a suction manifold coupled to the pump input and including at least one suction crossover port and a plurality of suction input ports that are each coupled to the tank output of one of the tanks and a pressure manifold coupled to the pump output and including at least one pressure crossover port and a plurality of pressure output ports that are each coupled to the tank input of one of the tanks. In some embodiments, the suction crossover port, the pressure crossover port, the suction input ports and the pressure output ports are flush with at least one plane defined by an outer face of the frame. In some embodiments, the skid further comprises an additional manifold that is not coupled to the pump and has at least one additional crossover port, at least one additional output port that is coupled to the tank input of one of the tanks, and at least one additional input port that is coupled to the tank output of the one of the tanks.

In some embodiments, the skid further comprises a check valve that prevents the reverse flow of the liquid medium through at least one of the pressure manifold, the pump and the suction manifold. In some embodiments, the skid further comprises a pump bypass that couples the suction manifold directly to the pressure manifold and a bypass valve that opens and closes the pump bypass. In some embodiments, each of the suction input ports and the pressure output ports has a corresponding control valve that opens and closes that port. In some embodiments, each of the skids comprise a controller that controls the opening and closing of the controls valves in order to effectuate a transfer of the liquid medium to and/or from one or more of the tanks through the skid. In some embodiments, when coupled to one or more other skids, the controller is able to control the opening and closing of the control valves of each of the other skids and is thereby able to effectuate a transfer of the liquid medium to and/or from one or more of the tanks coupled to the skid to and/or from one or more of the tanks coupled to the other skids. In some embodiments, the controller is able to store one or more predefined transfers and effectuate the transfers in a desired order, at a desired time and at a desired frequency. In some embodiments, each of the pressure manifold and the suction manifold comprise a T-joint that terminates in a pair of cleanout ports that are flush with a plane defined by a face of the frame.

A third aspect is directed to a method of operation a multi-tank liquid transfer system. The method comprises coupling a plurality of skids together, coupling the plurality of skids to a plurality of tanks storing at least one liquid medium and each having at least one tank output and at least one tank input, wherein each of the skids comprise a frame, a pump having a pump input and a pump output, a suction manifold coupled to the pump input and including at least one suction crossover port and a plurality of suction input ports that are each coupled to the tank output of one of the tanks and a pressure manifold coupled to the pump output and including at least one pressure crossover port and a plurality of pressure output ports that are each coupled to the tank input of one of the tanks and transferring the liquid medium from one of the tanks to another one of the tanks via the plurality of skids, wherein the suction manifolds of each of the skids are coupled together via the suction crossover ports of one or more of the skids and the pressure manifolds of each of the skids are coupled together via the pressure crossover ports of one or more of the one or more of the skids.

In some embodiments, each of the suction crossover ports, the pressure crossover ports, the suction input ports and the pressure output ports are flush with at least one plane defined by an outer face of the frame. In some embodiments, at least one of the skids comprises an additional manifold that is not coupled to the pump and has at least one additional crossover port, at least one additional output port that is coupled to the tank input of one of the tanks, and at least one additional input port that is coupled to the tank output of the one of the tanks. In some embodiments, at least one of the skids comprises a check valve that prevents the reverse flow of the liquid medium through at least one of the pressure manifold, the pump and the suction manifold. In some embodiments, at least one of the skids comprises a pump bypass that couples the suction manifold of the at least one of the skids directly to the pressure manifold of the at least one of the skids and a bypass valve that opens and closes the pump bypass. In some embodiments, each of the suction input ports and the pressure output ports has a corresponding control valve that opens and closes that port.

In some embodiments, each of the skids comprise a controller that controls the opening and closing of the controls valves in order to effectuate a transfer of the liquid medium to and/or from one or more of the tanks through the skid. In some embodiments, the method further comprises, when the skids are coupled together, controlling the opening and closing of the control valves of each of the skids coupled to one of the skids with the controller of the one of the skids thereby effectuating a transfer of the liquid medium to and/or from one or more of the tanks coupled to one of the skids to and/or from one or more of the tanks coupled to another of the skids. In some embodiments, the method further comprises storing one or more predefined transfers and effectuating the transfers in a desired order, at a desired time and at a desired frequency using the skids with the controller. In some embodiments, each of the pressure manifold and the suction manifold of at least one of the skids comprises a T-joint that terminates in a pair of cleanout ports that are flush with a plane defined by a face of the frame of that skid.

DETAILED DESCRIPTION OF THE INVENTION

Embodiments of the pumping system, method and device described herein are directed to a skid with a suction manifold coupled to a pump inlet and a pressure manifold connected to a pump outlet connects many tank inlet and outlet ports with other up and downstream facilities, allowing for all permutations of transfers between the connected fluid supply and discharge points. As a result, the pumping system, method and device create a flexible, scalable, standardized fluid-transfer skid that facilitates the automation and installation of complex, multiple tank processing systems. The skid eliminates the need for re-engineering and designing custom facilities, even when the process flow and timing may be different. skid sizing can be selected to fit within standard shipping container envelope or the skid itself can be designed to meet shipping container specifications. Existing systems do not integrate power distribution, communications, instrumentation, and controls with the pumping and valving while maintaining a low cost and flexible solution.

Figure 1:
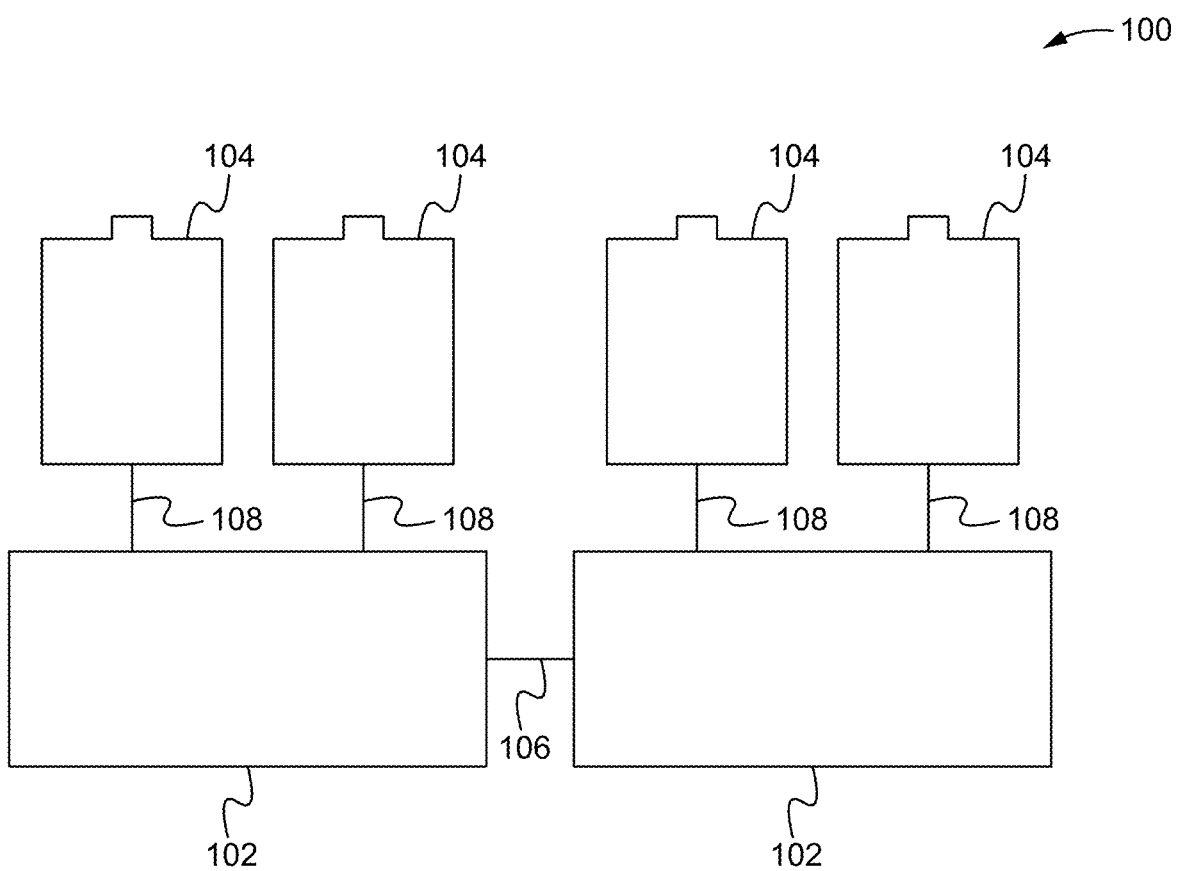
FIG. 1 illustrates a pumping system according to some embodiments.

FIG. 1 illustrates a pumping system 100 according to some embodiments. As shown in FIG. 1, the pumping system 100 comprises one or more skids 102 detachably coupled together via a skid coupling apparatus 106 and further detachably coupled within one or more tanks or vessels 104 via one or more tank coupling apparatuses 108. Although as shown in FIG. 1, two skids 102 are coupled with four tanks 104, a single skid 102 is able to be coupled to zero or any number of tanks 104 and/or a plurality of skids 102 are able to be coupled together and each coupled to zero or any number of tanks 104.

Figure 2:
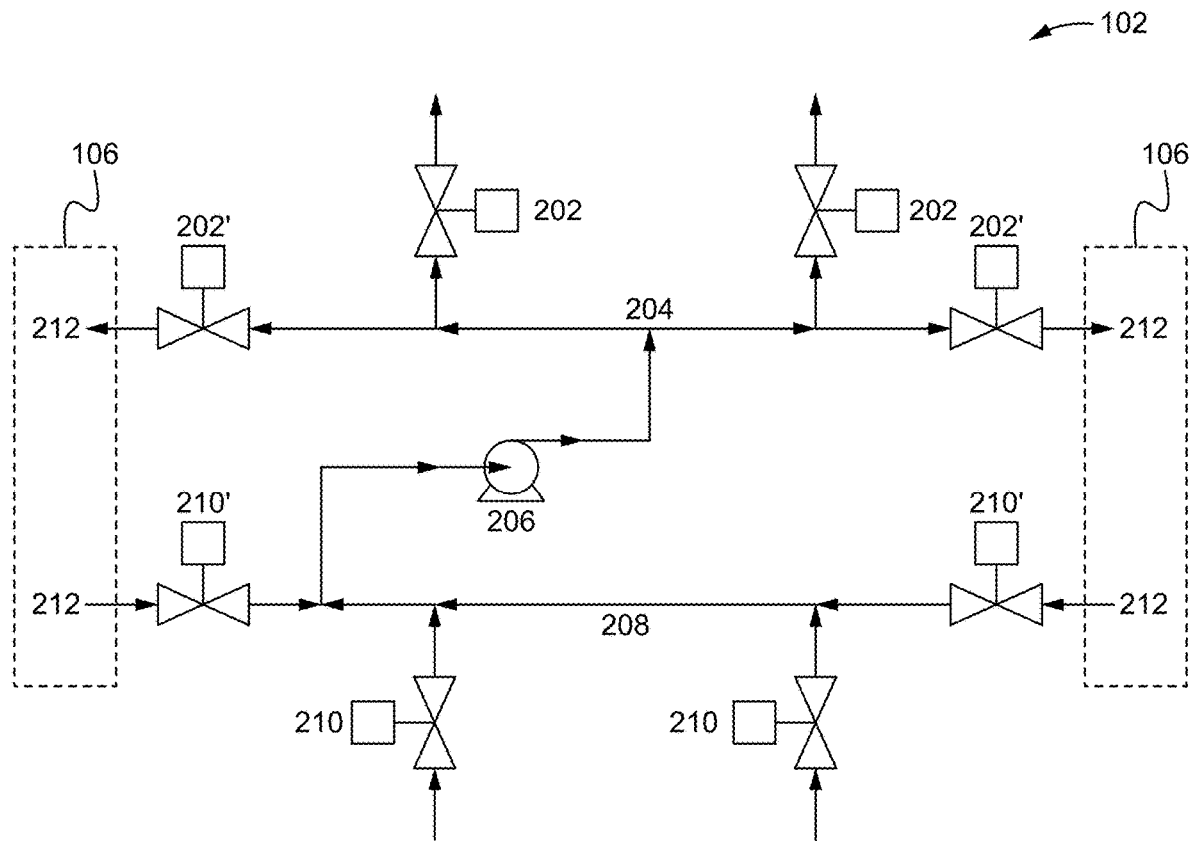
FIG. 2 illustrates a skid according to some embodiments.
Figure 6:
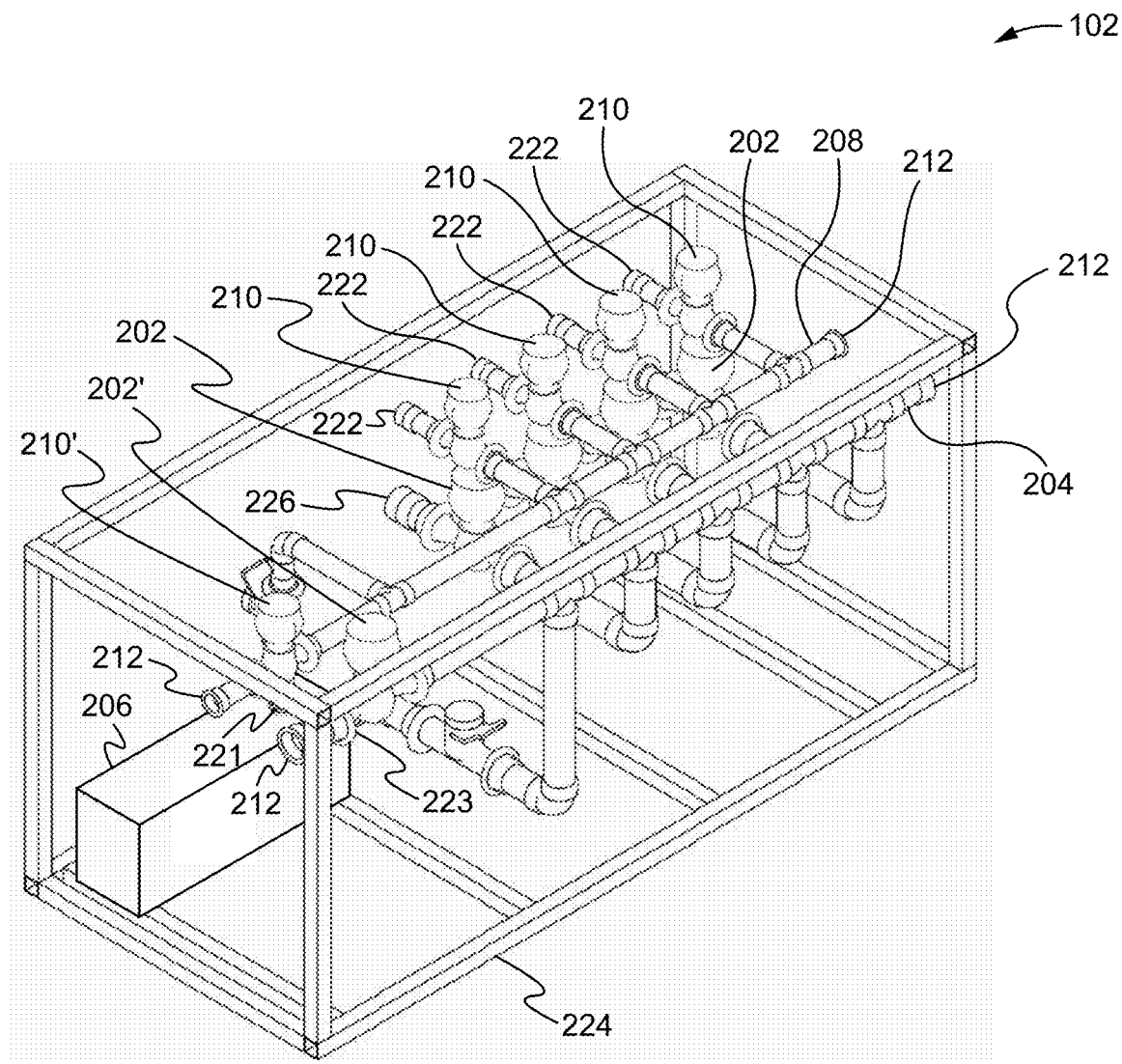
FIG. 6 illustrates a perspective view of a skid including the frame according to some embodiments.

FIG. 2 illustrates a skid 102 according to some embodiments. As shown in FIG. 2, the skid 102 comprises a suction manifold 208 with one or more inlet control valves 210 coupled to the intake of a pump 206 and a pressure manifold 204 coupled between the outlet of the pump 206 and one or more outlet control valves 202. In some embodiments, one or more ends of the skid 102 have connection points (e.g. ports) for auxiliary connections 212 to either additional skids 102 or other plant services such as water and sewer. For example, skid A in FIG. 3 has auxiliary connections 212 on two sides whereas skid B only has auxiliary connections 212 on one side. Alternatively, the auxiliary connections 212 and/or valves 202/210 adjacent to them are able to be omitted. In some embodiments, one or more of the auxiliary connections 212 are able to be capped off when not coupled to another skid 102 or other service (as shown in FIG. 6) and/or one or more of the control valves 202'/210' adjacent to the connections 212 are able to serve as crossover valves that control the ability of medium to cross between the skid 102 and the additional skids 102 and/or other services.

In some embodiments, the suction manifold 208 comprises four to eight parallel, independently actuated valves 210 and/or associated input ports. Alternatively, the suction manifold 208 is able to have more or less valves 210 and/or input ports. In some embodiments, the pressure manifold 204 comprises four to eight parallel, independently actuated valves 202 and/or output ports. Alternatively, the pressure manifold 204 is able to have more or less valves 202 and/or output ports. In some embodiments, the valves are able to be any appropriate type of valve. In some embodiments, the pump 206 is able to be any appropriate type of pump. In some embodiments, as shown in FIG. 6 below, all of the valves 210/202, connections 212, piping 204/208, and the pump 206 are enveloped and mounted within a frame 224 thereby simplifying control and power supply wiring.

Each valve 202/210 is able to terminate at a connection point (e.g. port) contained within the frame 224 for coupling to external piping for conveying liquids and slurries between tanks/vessels 104. Each coupled tank 104 is able to have at least one discharge port 220 and at least one return port 218 for connection with the skid 102 (see FIG. 3), but may have more than one, for example if one or more of the tanks 104 need to be decanted from the bottom of the tank 104 for certain transfers and from the top for others there is able to be one or both of discharge/return ports positioned at the top and bottom of the tank 104.

The size of the skid 102 is able to be constrained in order to keep the skid 102 small enough to easily transport. For fitting the skid 102 within a shipping container, the frame 24 is able to be as large as 9' by 9' in cross section and as long as 30 feet. At the same time, enough space is left within the skid 102 to provide access for maintenance. This effectively limits the number of connections possible within the skid 102. In addition, the farther away the tanks 104 get from the skid 102, the more pressure it takes to pump the liquid to and from the tank 104. Therefore, the number of tanks 104 coupled to a skid 102 is typically constrained as well, and when more tanks 104 are required, more skids 102 are able to be added.

Figure 3:
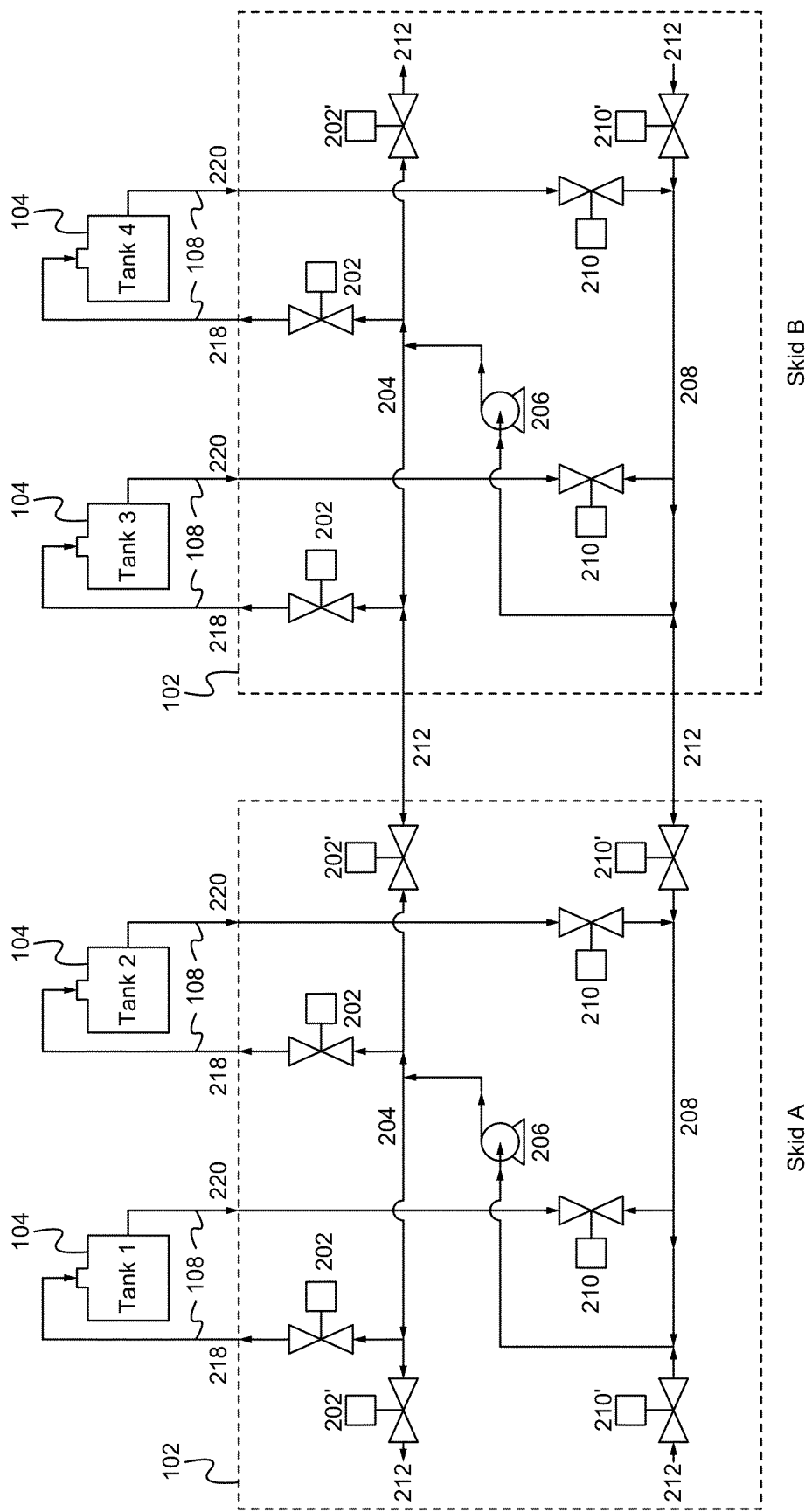
FIG. 3 illustrates an installation of tanks with two skids cross-coupled at the common skid terminal according to some embodiments.

FIG. 3 illustrates an installation of tanks 104 with two skids 102 cross-coupled at the common skid terminal according to some embodiments. As shown in FIG. 3, the suction manifold 208 and pressure manifold 204 of each of the skids 102 are coupled together via auxiliary connections 212, with the auxiliary connections 212 being controlled by valves 202' and 210' of skid A (e.g. "crossover valves"). In some embodiments, each skid 102 has its own crossover valves that both need to be opened to effectuate a connection. Alternatively, only one or none of the skids 102 are able to have crossover valves such that only one set of valves 202', 210' need to be opened, or the manifolds are always shared (e.g. because there are no crossover valves to selectively isolate them once they are coupled via the connections 212). Each tank suction control valve 210 is coupled to a separate tank discharge port 220, and each tank pressure control valve 202 is coupled to a separate tank return port 218. With this configuration, the pumps 206 are redundant since either pump 206 is able to affect the fluid transfer of the other, however the skids 102 are also able to be isolated from each other by keeping the "crossover" valves 202' and 210' (e.g. adjacent to the coupled auxiliary connections 212) closed. For example, a Tank 1 to Tank 2 transfer can run simultaneously with Tank 3 to Tank 4 (e.g. via their respective pumps 206 with skid A and skid B isolated via the valves 202', 210'), but the Tank 1 to Tank 2 transfer, which are coupled to skid A is also able to be performed without the skid A pump 202 and instead using the skid B pump 206 (by opening the "crossover" valves 202', 210' such that the skid B pump 206 has access to Tank 1 and Tank 2).

Figure 4:
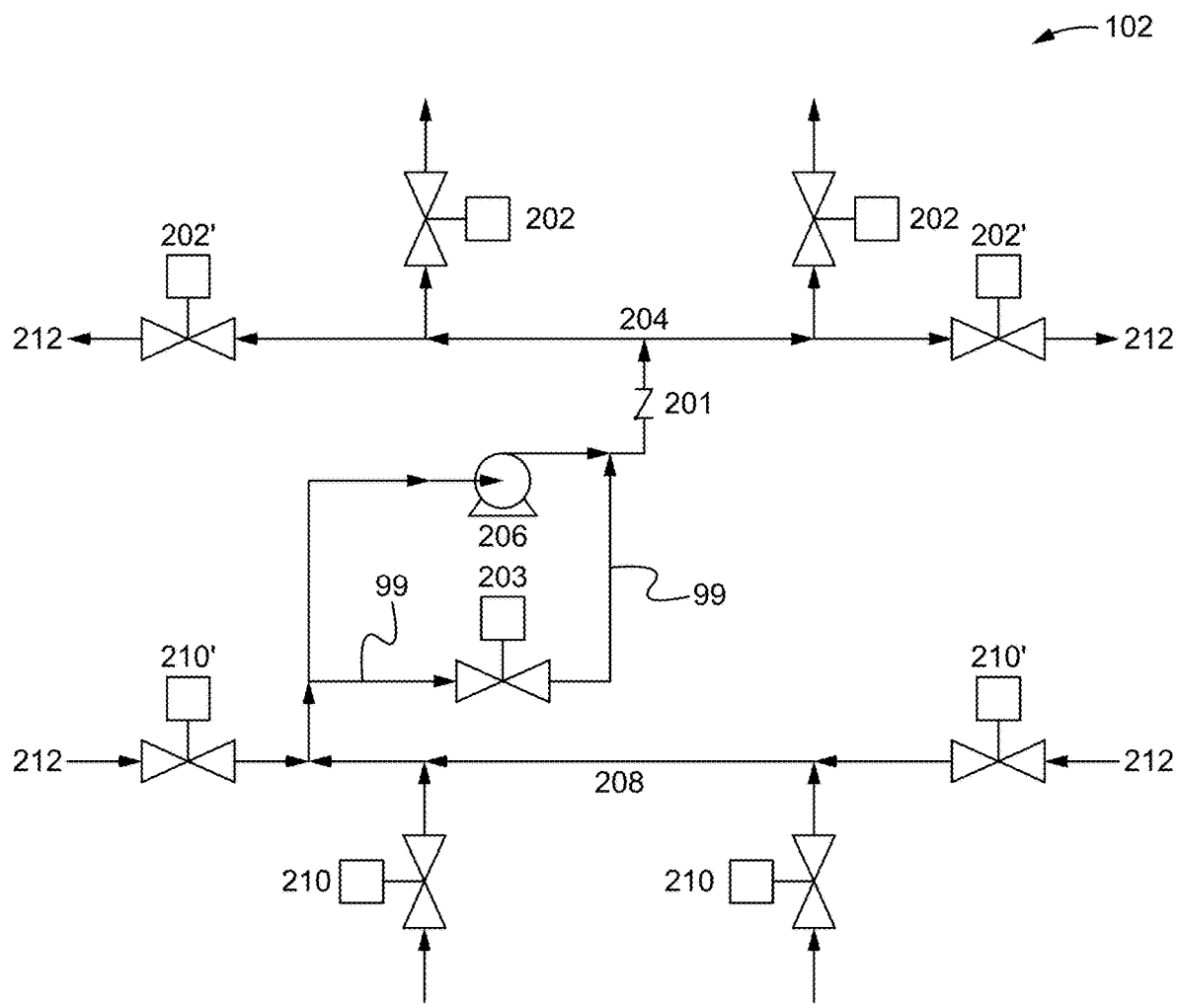
FIG. 4 illustrates an alternate skid according to some embodiments.

FIG. 4 illustrates an alternate skid 102 according to some embodiments. The skid 102 of FIG. 4 is able to be substantially similar to the skid 102 of FIGS. 2 and 3 except for the differences described herein. As shown in FIG. 4, the skid 102 comprises a check valve 201, a pump bypass 99 and a bypass valve 203 (e.g. in the case when the pump bypass and bypass valve is included for gravity flow and only flow from the suction to the pressure manifold is desired). The check valve 201 is able to be included to prevent back flow from the pressure manifold 204 to the suction manifold 208 (e.g. through the bypass 99). Alternatively, the pump bypass 99 and the bypass valve 203 are able to be omitted, but the check valve 201 is still used because the pump 206 design does not prevent backflow through the pump 206. Although as shown in FIG. 4 the check valve 201 is positioned in the pressure manifold 204, in some embodiments, the check valve 201 is able to be positioned in the suction manifold 208, in the bypass 99 between the bypass valve 203 and the pressure manifold 204 or in the bypass 99 between the bypass valve 203 and the suction manifold 208.

Figure 5:
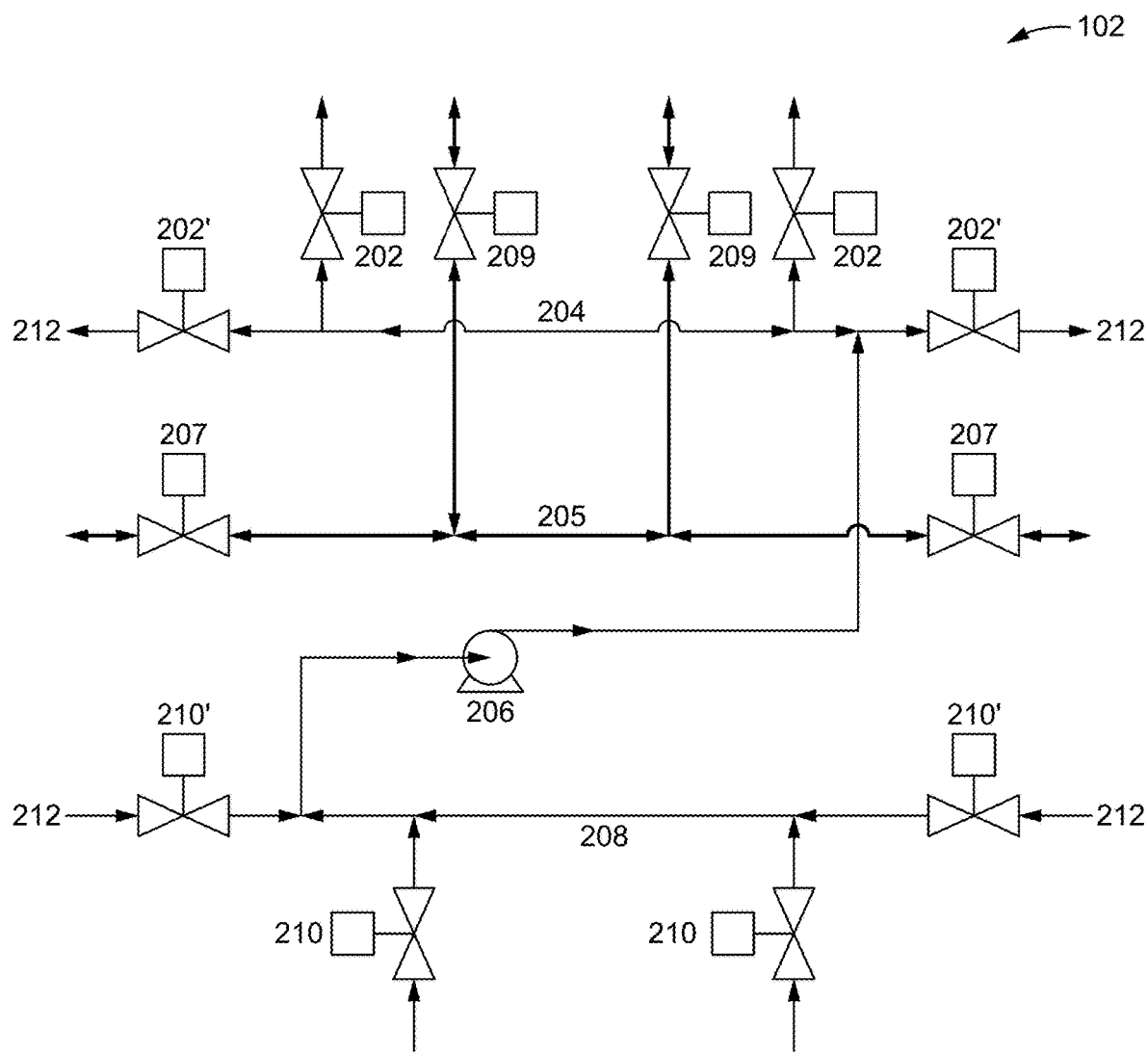
FIG. 5 illustrates an alternate skid according to some embodiments.

FIG. 5 illustrates an alternate skid 102 according to some embodiments. The skid 102 of FIG. 5 is able to be substantially similar to the skid 102 of FIGS. 2 and 3 except for the differences described herein. As shown in FIG. 5, the skid 102 comprises a third manifold 205 (e.g. for fluid transfers in which the pump 206 is not needed). Like the other manifolds 204, 208, the third manifold 205 is able to have one or more control valves 209 and corresponding ports for coupling with the input/output of the tanks 104 and/or one or more auxiliary connections (each having or not having a corresponding crossover control valve 207). Typically, gravity would provide the motive force, in which case the third manifold 205 would be a gravity manifold. In this embodiment, flow is able to bi-directional and the direction of flow would purely be determined by the relative heights of the fluid within each tank 104 coupled to the gravity manifold 205. There would be no need for separate supply and return lines, as a single connection point serves the purpose of either supply or return, depending on the direction of the gravity head. The valves 209 and/or 207 are able to be a valve type that allows for valve proportioning for flow control (e.g. plug valves). Alternatively, other types of valves are able to be used such as other valves described herein. This embodiment is useful in applications where gravity flow is required simultaneously with pumped flow, for example when a gravity drain to sewer needs to take place while fluid is concurrently transferred between two tanks. Like the other manifolds 204, 208, the third/gravity manifold 205 is able to be cross-coupled to additional skids 102 (e.g. the gravity or other manifolds of other skids 102), allowing for gravity flow between tanks or between tanks and terminal connections coupled to separate skids 102.

FIG. 6 illustrates a perspective view of a skid 102 including the frame according to some embodiments. The skid 102 of FIG. 6 is able to be substantially similar to the skid 102 of FIG. 2 except for the differences described herein. As shown in FIG. 6, the suction manifold 208 couples the suction control valves 210 to the pump inlet 221. The outlet ports 220 from the coupled tanks 104 (not shown) are coupled to the suction ports 222 flush with the faces of the skid frame 224. Similarly, the pressure manifold 204 extends from the pump outlet 223 and couples the pressure control valves 202 to the pressure ports 226 (which are able to be flush with the end/plane of the frame 224 and couple to the inlet ports 218 from the coupled tanks 104). In the embodiment shown in FIG. 6, one set of end terminals/connections 212 has control valves 202', 210,' while the other set (e.g. the far side away from the pump 206) does not. As shown in FIG. 6, the connections 212 at the far end of the skid 102 without control valves are ready to be coupled to the end terminals of another skid 102 that is able to have control valves. The latter skid 102 may have control valves on both end terminals. The skid 102 is also able to be designed to include lock tabs integral to the frame that allow for mounting in a standard shipping container. As describe above, each of the ports and/or connections are able to be flush with a plane formed by an end of the frame 224. Alternatively, one or more of the ports and/or connections are able to be further within the frame 224 such that they are not flush with an end plane of the frame 224.

Figure 7:
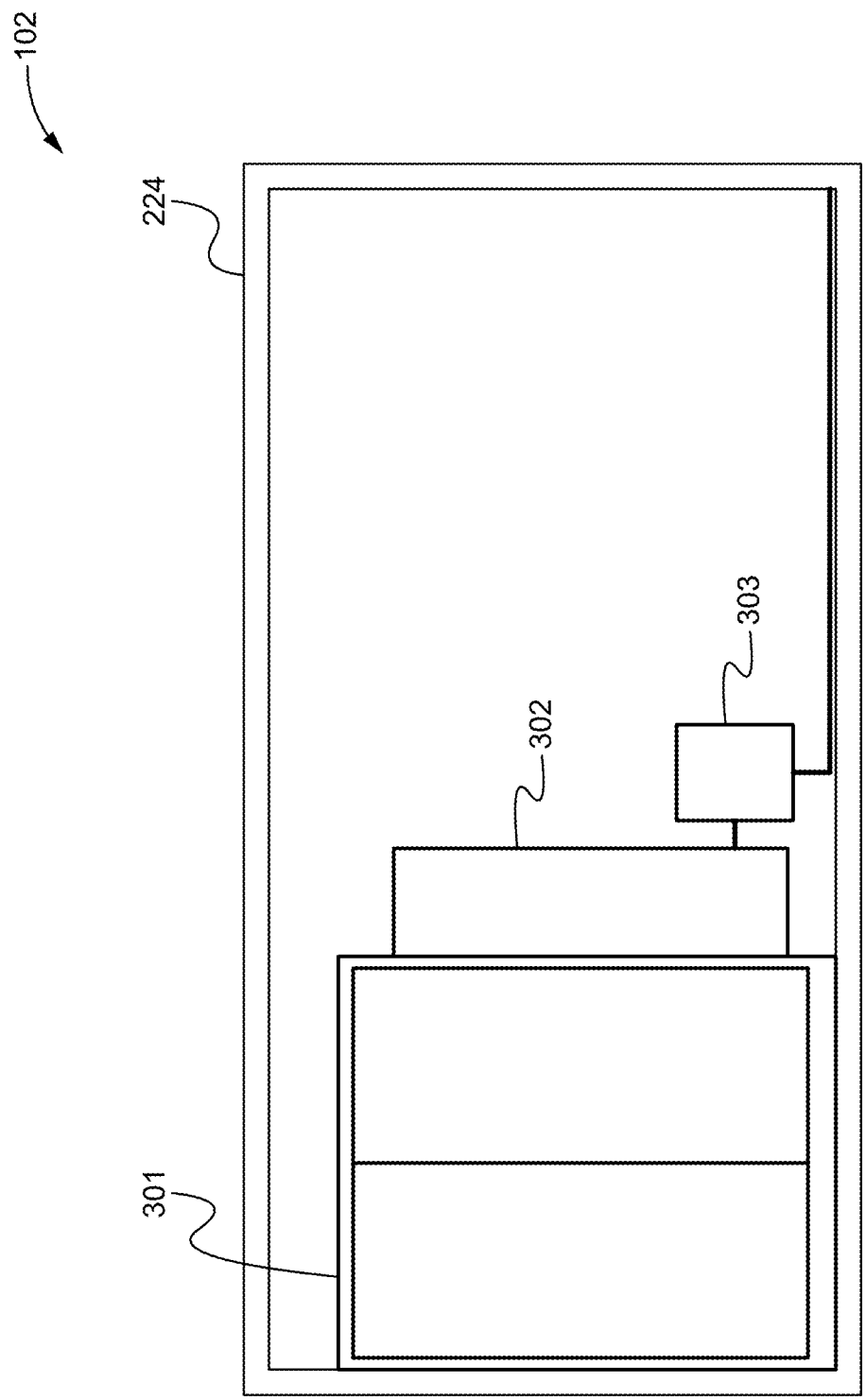
FIG. 7 illustrates a front view of a skid having a control panel according to some embodiments.

FIG. 7 illustrates a front view of a skid 102 having a control panel according to some embodiments. The skid 102 of FIG. 7 is able to be substantially similar to the skid 102 of FIG. 2 except for the differences described herein. As shown in FIG. 7, the skid 102 includes a control panel 301 that houses an electrical power distribution, instrumentation interfaces, electrical signal conditioning, computer systems, screens, battery backups, and other control and electrical components, an air conditioning unit 302, and a step-down transformer 303 to provide both high and low voltages as needed. Alternatively, one or more of the above features are able to be omitted. Conduits housing high and low voltage wiring are able to terminate inside the control panel 301 and/or run along the frame 224 to distribute electricity and communications wiring to various components within as well as external to the skid frame housing.

The control panel 301 is able to able to comprise a single-point disconnect for electrical safety and all of the wiring needed to distribute power to and communicate with the instruments, pumps 206, and valves 202, 210 throughout the skid 102, as well as any desired instrumentation outside the skid (i.e. on the attached tanks). In this way, a single control panel 301 is able to integrate all of the instrumentation and control all of the equipment coupled to the skid 102. If an additional skid 102 is coupled to the first one, the two skid's control panels 301 are able to be wired to communicate with each other such that one skid's control panel 301 is able to control all of the coupled skids 102. The skids 102 are also able to be operated independently if required.

A single user interface for user control is attached to the skid frame 224. The user interface can be customized to the user's needs, depending on the features available in commercial units at the time. Typically, the user interface is programmable, is able to be operated and monitored remotely (e.g. via a wireless network) as well as locally, is able to store and retrieve operational data, and is able to be modified and updated as control technology evolves. In some embodiments, the user interface is located outside the skid 102 for convenience, for example, in an adjacent climate-controlled structure, and the wiring for communications with the skid 102 is installed separately.

Figure 8:
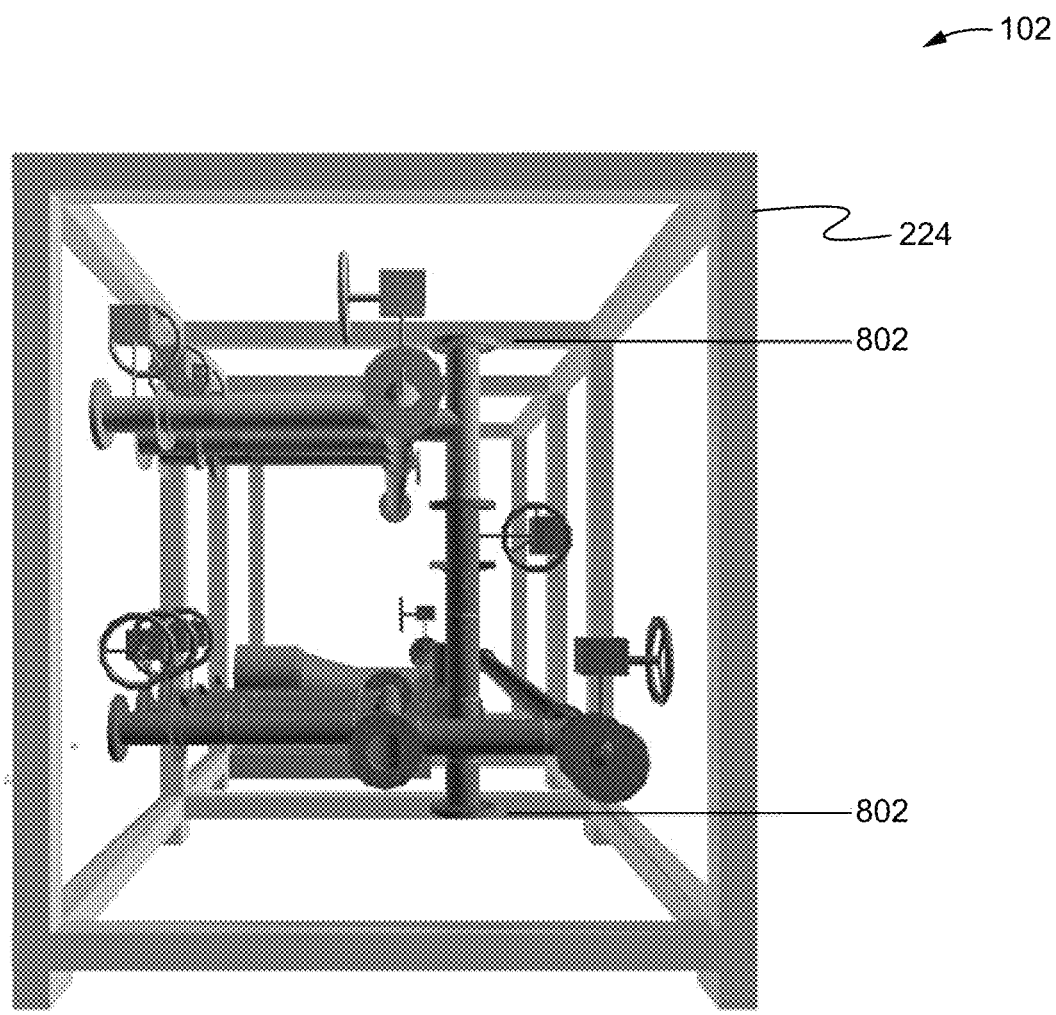
FIG. 8 illustrates a side view of a skid according to some embodiments.

FIG. 8 illustrates a side view of a skid 102 according to some embodiments. The skid 102 of FIG. 8 is able to be substantially similar to the skid 102 of FIG. 2 except for the differences described herein. As shown in FIG. 8, the ninety degree elbows of the manifolds 204, 208 have been replaced with tees that have flanges/cleanout ports 802 that are able to be capped or coupled to additional equipment for facilitating clean-out of clogs in the piping.

In operation, to utilize a skid 102, one valve 210 on the suction manifold 208 is opened, one valve 202 on the pressure manifold 204 is opened, and then after allowing sufficient time as to fully open the valves, the pump 206 is initiated. At the end of a transfer, the pump 206 is shut down and the valves are closed. The lines may be flushed with a small volume of fresh water if desired to clear the lines between transfers or at the end of a series of transfers. The number of transfer options between tanks 104 depends on the number of valves on each manifold, such that the product of the number of suction and pressure manifold valves determines the number of possible transfer options. For an example of a simple design with a single discharge 220 and return port 218 on each of four tanks 104, see the matrix below:

TABLE 1

| Valves to Open | Tank 1 Supply | Tank 2 Supply | Tank 3 Supply | Tank 4 Supply |
| --- | --- | --- | --- | --- |
| Tank 1 Return | Tank 1 Mix | Tank 2 to 1 transfer | Tank 3 to 1 transfer | Tank 4 to 1 transfer |
| Tank 2 Return | Tank 1 to 2 transfer | Tank 2 Mix | Tank 3 to 2 transfer | Tank 4 to 2 transfer |
| Tank 3 Return | Tank 1 to 3 transfer | Tank 2 to 3 transfer | Tank 3 Mix | Tank 4 to 3 transfer |
| Tank 4 Return | Tank 1 to 4 transfer | Tank 2 to 4 transfer | Tank 3 to 4 transfer | Tank 4 Mix |
| Sewer Discharge | Tank 1 to sewer | Tank 2 to sewer | Tank 3 to sewer | Tank 4 to sewer |

This matrix can be expanded for each additional supply and return connection point of each tank 104 (and the corresponding input and output ports of the manifolds), including additional ports on the same tanks 104, additional skids 102 (with all of the additional connection points for the new skid), as well as ports (e.g. connections 112) coupling the skid 102 to site water supply and/or other downstream processes. The water supply may be coupled to the suction manifold 208 and/or the pressure manifold 204. The latter allows for backwashing of the pump 206. The former allows for backwashing of the suction ports 222 and pressure ports 226, so long as a backflow preventer is installed on the water supply to prevent contamination of the clean water system with process fluids.

In order to effectuate the operation, the control system of the control panel 301 is able to be programmed to allow for activation of each process listed in the above matrix, with user controlled/input set points for transfer volumes (which may be based on fluid flow rate, flow duration and/or tank volume). In addition, the above processes can be linked in a predetermined series based on the process needs, and automatically repeated on a user inputted schedule. For example, a user is able to specify a tank 1 to tank 2 transfer of a desired volume, at a desired time and/or at a desired frequency and the control panel 301 will automatically operate the valves and/or pump in order to effectuate the desired volume transfer at the desired time or times/frequency (e.g. the desired volume is able to be achieved by the control panel automatically adjusting the flow rate and/or flow duration with an understanding of a current and/or maximum volume of the tanks). In this manner, the control panel 301 is able to store a plurality of transfers input by a user and execute those transfers in a specified order, frequency and/or at a specified time.

Figure 9:
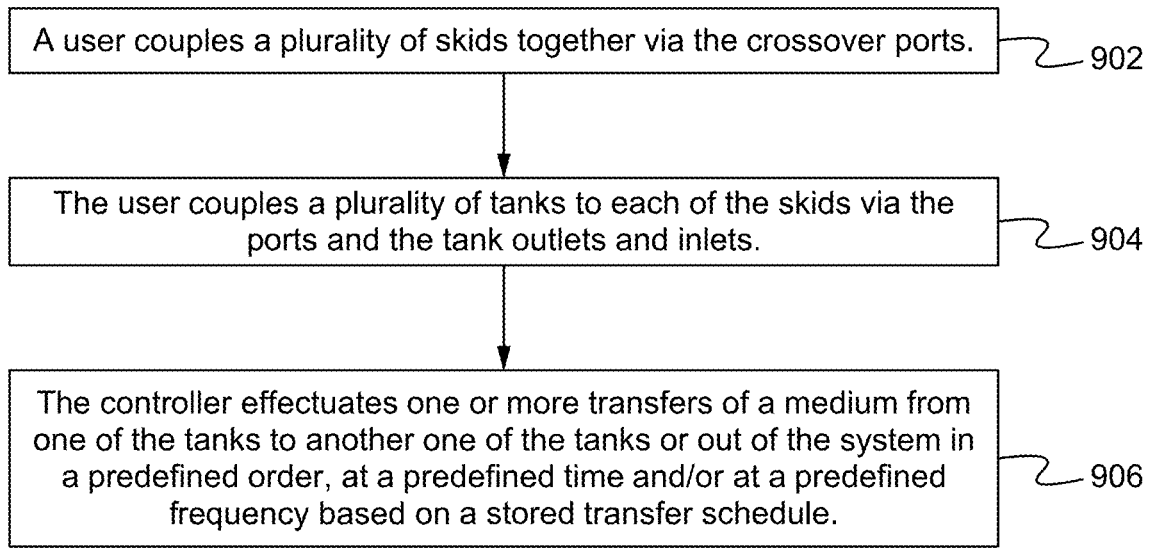
FIG. 9 illustrates a method of operating a skid according to some embodiments.

FIG. 9 illustrates a method of operating a skid 102 according to some embodiments. As shown in FIG. 9, a user couples a plurality of skids 102 together via the crossover ports at the step 902. The user couples a plurality of tanks 104 to each of the skids 102 via the ports 222, 226 and the tank outlets and inlets 220, 218 at the step 904. The controller 301 effectuates one or more transfers of a medium from one of the tanks 104 to another one of the tanks 104 or out of the system in a predefined order, at a predefined time and/or at a predefined frequency based on a stored transfer schedule at the step 906, wherein each of the transfers of the transfer schedule are able to define the source and/or destination of the medium, the volume of medium to transfer and/or the time/frequency of the transfer. In some embodiments, when multiple skids 102 are coupled together, the controller 301 of one of the skids 102 controls the opening and closing of the control valves 202, 210 of each of the skids 102 such that it is able to transfer liquid from and to tanks that are not directly coupled to the one of the skids 102.

In some embodiments, the controller 301 stores one or more predefined transfers and executes the transfers in a desired order, at a desired time and at a desired frequency using the skids. In particular, these transfers are able to be added to the controller by a user using the user interface (e.g. by entering a medium source and destination, a volume, a time/duration/frequency and/or an order with respect to and/or association with one or more other transfers). In some embodiments, a transfer is able to be associated with other transfers such that an order or priority between the transfers is stored, a relative timing between the transfers is stored (e.g. transfer A occurs X hours after transfer B, transfer A and transfer B occur concurrently or simultaneously, transfer A only occurs if both transfer B and transfer C have occurred in the past X hours), a relative volume relation between transfers (e.g. the volume of transfer A needs to be equal to or greater than the volume of transfer B, the volume of transfer A is equal to 50% of the volume of a sum of transfers B and C) and/or a relative relation of other entered parameters between the transfers (e.g. flow rate, duration, fill destination tank to 50% capacity, or other entered parameters). In some embodiments, the controller automatically determines a flow rate, duration and/or current tank volume/total capacity in order to perform an entered desired volume transfer. Alternatively or in addition, a user is able to specify one or more such parameters. In some embodiments, the controller 301 is able to refrain from performing one or more transfers and/or provide a message warning via the user interface if stored transfers would cause an error (e.g. if one or more stored transfers, if executed, would cause a tank to overflow and/or a tank lacks sufficient medium to transfer the desired volume). In some embodiments, the controller 301 is able to be in communication with one or more tank sensors and adjust the performance of the transfers based on sensed values (e.g. perform transfer A until tank B has a pH value of X).

As a result, the pumping system, method and device described herein provides the benefits of simplifying installation and operation of pumps, valves, pipe manifolds, wiring, controls, and instruments required for executing and automating such transfers. Further, skid's modular and combinable features reduce costs and time of construction, and enable controls to be flexibly programmed which allows for faster and less expensive deployment, as well as built-in redundancy and efficiency. Moreover, the system creates a flexible, scalable, standardized fluid-transfer skid that facilitates the automation and installation of complex, multiple tank processing systems. The skid eliminates the need for re-engineering and designing custom facilities, even when the process flow and timing may be different. Skid sizing can be selected to fit within standard shipping container envelope or the skid itself can be designed to meet shipping container specifications. Existing systems do not integrate power distribution, communications, instrumentation, and controls with the pumping and valving while maintaining a low cost and flexible solution.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims. For example although different embodiments of skids are illustrated separately, the one or more of the features of the separately illustrated skids are able to be combined into a single skid. Similarly, although FIG. 3 illustrates two skids having the features of FIG. 2 coupled with four tanks 104, any number of skids 102 are able to be coupled with any number of tanks 104, wherein one or more of the skids 102 are able to have the features of one or more of the different embodiments of the skids described herein or a combination thereof.

What is claimed is:

1. A multi-tank liquid transfer system, the system comprising:
   a plurality of tanks storing at least one liquid medium and each having at least one tank output and at least one tank input; and
   a plurality of skids coupled with the plurality of tanks, wherein each of the skids comprise:
   a frame;
   a pump having a pump input and a pump output;

a suction manifold coupled to the pump input and including at least one suction crossover port and a plurality of suction input ports that are each coupled to the tank output of one of the tanks; and a pressure manifold coupled to the pump output and including at least one pressure crossover port and a plurality of pressure output ports that are each coupled to the tank input of one of the tanks;

wherein the suction manifolds of each of the skids are coupled together via the suction crossover ports of one or more of the skids and the pressure manifolds of each of the skids are coupled together via the pressure crossover ports of one or more of the one or more of the skids.

2. The system of claim 1, wherein each of the suction crossover ports, the pressure crossover ports, the suction input ports and the pressure output ports are flush with at least one plane defined by an outer face of the frame.

3. The system of claim 1, wherein at least one of the skids comprises an additional manifold that is not coupled to the pump and has at least one additional crossover port, at least one additional output port that is coupled to the tank input of one of the tanks, and at least one additional input port that is coupled to the tank output of the one of the tanks.

4. The system of claim 1, wherein at least one of the skids comprises a check valve that prevents the reverse flow of the liquid medium through at least one of the pressure manifold, the pump and the suction manifold.

5. The system of claim 4, wherein at least one of the skids comprises a pump bypass that couples the suction manifold of the at least one of the skids directly to the pressure manifold of the at least one of the skids and a bypass valve that opens and closes the pump bypass.

6. The system of claim 1, wherein each of the suction input ports and the pressure output ports has a corresponding control valve that opens and closes that port.

7. The system of claim 6, wherein each of the skids comprise a controller that controls the opening and closing of the controls valves in order to effectuate a transfer of the liquid medium to and/or from one or more of the tanks through the skid.

8. The system of claim 7, wherein when coupled together, the controller of one of the skids is able to control the opening and closing of the control valves of each of the skids coupled to the one of the skids and is thereby able to effectuate a transfer of the liquid medium to and/or from one or more of the tanks coupled to one of the skids to and/or from one or more of the tanks coupled to another of the skids.

9. The system of claim 8, wherein the controller is able to store one or more predefined transfers and effectuate the transfers in a desired order, at a desired time and at a desired frequency.

10. The system of claim 1, wherein each of the pressure manifold and the suction manifold of at least one of the skids comprises a T-joint that terminates in a pair of cleanout ports that are flush with a plane defined by a face of the frame of that skid.

11. A skid for use in a multi-tank liquid transfer system including a plurality of tanks storing at least one liquid medium and each having at least one tank output and at least one tank input, the skid comprising:
a frame having a top, a bottom, a front side, a back side, a left side and a right side;
a pump having a pump input and a pump output;
a suction manifold coupled to the pump input and including at least one suction crossover port and a plurality of suction input ports that are each coupled to the tank output of one of the tanks; and
a pressure manifold coupled to the pump output and including at least one pressure crossover port and a plurality of pressure output ports that are each coupled to the tank input of one of the tanks, wherein each of the suction input ports and the pressure output ports face a front plane defined by the front side of the frame, and further wherein the at least one suction crossover port and the at least one pressure crossover port face at least one of a left plane defined by the left side and a right plane defined by the right side.

12. The skid of claim 11, wherein the suction crossover port, the pressure crossover port, the suction input ports and the pressure output ports are flush with one of the front plane, the left plane and the right plane.

13. The skid of claim 11, further comprising an additional manifold that is not coupled to the pump and has at least one additional crossover port, at least one additional output port that is coupled to the tank input of one of the tanks, and at least one additional input port that is coupled to the tank output of the one of the tanks.

14. The skid of claim 11, further comprising a check valve that prevents the reverse flow of the liquid medium through at least one of the pressure manifold, the pump and the suction manifold.

15. The skid of claim 14, further comprising a pump bypass that couples the suction manifold directly to the pressure manifold and a bypass valve that opens and closes the pump bypass.

16. The skid of claim 11, wherein each of the suction input ports and the pressure output ports has a corresponding control valve that opens and closes that port.

17. The skid of claim 16, wherein each of the skids comprise a controller that controls the opening and closing of the controls valves in order to effectuate a transfer of the liquid medium to and/or from one or more of the tanks through the skid.

18. The skid of claim 17, wherein when coupled to one or more other skids, the controller is able to control the opening and closing of the control valves of each of the other skids and is thereby able to effectuate a transfer of the liquid medium to and/or from one or more of the tanks coupled to the skid to and/or from one or more of the tanks coupled to the other skids.

19. The skid of claim 18, wherein the controller is able to store one or more predefined transfers and effectuate the transfers in a desired order, at a desired time and at a desired frequency.

20. The skid of claim 11, wherein each of the pressure manifold and the suction manifold comprise a T-joint that terminates in a pair of cleanout ports that are flush with a plane defined by a face of the frame.

21. A method of operation a multi-tank liquid transfer system, the method comprising:
coupling a plurality of skids together;
coupling the plurality of skids to a plurality of tanks storing at least one liquid medium and each having at least one tank output and at least one tank input, wherein each of the skids comprise:
a frame;
a pump having a pump input and a pump output;
a suction manifold coupled to the pump input and including at least one suction crossover port and a plurality of suction input ports that are each coupled to the tank output of one of the tanks; and a pressure manifold coupled to the pump output and including at least one pressure crossover port and a plurality of pressure output ports that are each coupled to the tank input of one of the tanks; and transferring the liquid medium from one of the tanks to another one of the tanks via the plurality of skids, wherein the suction manifolds of each of the skids are coupled together via the suction crossover ports of one or more of the skids and the pressure manifolds of each of the skids are coupled together via the pressure crossover ports of one or more of the one or more of the skids.

22. The method of claim 21, wherein each of the suction crossover ports, the pressure crossover ports, the suction input ports and the pressure output ports are flush with at least one plane defined by an outer face of the frame.

23. The method of claim 21, wherein at least one of the skids comprises an additional manifold that is not coupled to the pump and has at least one additional crossover port, at least one additional output port that is coupled to the tank input of one of the tanks, and at least one additional input port that is coupled to the tank output of the one of the tanks.

24. The method of claim 21, wherein at least one of the skids comprises a check valve that prevents the reverse flow of the liquid medium through at least one of the pressure manifold, the pump and the suction manifold.

25. The method of claim 24, wherein at least one of the skids comprises a pump bypass that couples the suction manifold of the at least one of the skids directly to the pressure manifold of the at least one of the skids and a bypass valve that opens and closes the pump bypass.

26. The method of claim 21, wherein each of the suction input ports and the pressure output ports has a corresponding control valve that opens and closes that port.

27. The method of claim 26, wherein each of the skids comprise a controller that controls the opening and closing of the controls valves in order to effectuate a transfer of the liquid medium to and/or from one or more of the tanks through the skid.

28. The method of claim 27, further comprising, when the skids are coupled together, controlling the opening and closing of the control valves of each of the skids coupled to one of the skids with the controller of the one of the skids thereby effectuating a transfer of the liquid medium to and/or from one or more of the tanks coupled to one of the skids to and/or from one or more of the tanks coupled to another of the skids.

29. The method of claim 28, further comprising storing one or more predefined transfers and effectuating the transfers in a desired order, at a desired time and at a desired frequency using the skids with the controller.

30. The method of claim 21, wherein each of the pressure manifold and the suction manifold of at least one of the skids comprises a T-joint that terminates in a pair of cleanout ports that are flush with a plane defined by a face of the frame of that skid.

* * * * *